(12) United States Patent
Light

(10) Patent No.: US 6,389,412 B1
(45) Date of Patent: May 14, 2002

(54) METHOD AND SYSTEM FOR CONSTRUCTING INTEGRATED METADATA

(75) Inventor: John Light, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,032

(22) Filed: Dec. 31, 1998

(51) Int. Cl.[7] .............................................. G06F 17/30
(52) U.S. Cl. ................... 707/3; 707/4; 707/5
(58) Field of Search ............................ 707/1, 2, 3, 4, 707/5, 101, 104, 501; 709/201, 221; 345/356; 704/270.1

(56) References Cited

U.S. PATENT DOCUMENTS

| | | | | |
|---|---|---|---|---|
| 5,594,792 A | * | 1/1997 | Chouraki et al. | 709/201 |
| 5,596,744 A | * | 1/1997 | Dao et al. | 707/10 |
| 5,737,734 A | * | 4/1998 | Schultz | 707/5 |
| 5,774,888 A | | 6/1998 | Light | 707/1 |
| 5,778,363 A | | 7/1998 | Light | 707/5 |
| 5,842,217 A | | 11/1998 | Light | 707/101 |
| 5,873,076 A | * | 2/1999 | Barr et al. | 707/3 |
| 6,014,662 A | * | 1/2000 | Moran et al. | 707/3 |
| 6,038,560 A | * | 3/2000 | Wical | 707/5 |
| 6,154,213 A | * | 11/2000 | Rennison et al. | 345/356 |
| 6,170,011 B1 | * | 1/2001 | Macleod Beck et al. | 709/224 |

OTHER PUBLICATIONS

Manber et al., "GLIMPSE: A Tool to Search Through Entire File Systems," University Of Arizona, Dept. Of Computer Science, TR 93–34, Oct. 1993, pp. 1–10.

Light, "Distributed, Graphical, Topic–oriented Document Search System," *Sixth Int'l Conference on Information And Knowledge Management*, Las Vegas, NV, Nov. 10–14, 1997.

* cited by examiner

*Primary Examiner*—Diane D. Mizrahi
(74) *Attorney, Agent, or Firm*—Kenyon & Kenyon

(57) ABSTRACT

A method and system are disclosed for creating compact integrated metadata representing a set of documents. Each document comprises a set of terms. The metadata comprises a set of topic profiles, each topic profile defining a relationship between a topic and the documents, a set of document surrogates, and a list of terms which may distinguish among documents. Each document surrogate describes a subset of terms occurring in the document and thus permits a document to be searched for by term as well as topic.

26 Claims, 9 Drawing Sheets

List of Distinguishing Terms

List of Alternate Forms

METHOD AND SYSTEM FOR CONSTRUCTING INTEGRATED METADATA

BACKGROUND OF THE INVENTION

1. Field of the Invention

The present invention relates to the field of computer systems. More specifically, the present invention relates to information retrieval (IR) technology, in particular to creating metadata for searching over multiple filtering criteria such as both text and topic criteria.

2. Background Information

Modern computer technology allows databases to incorporate ever greater amounts of information. In order to take full advantage of these advances, methods must be developed to allow a user to quickly, easily and inexpensively identify, retrieve, and order information in a database. Effective IR requires that the search be inexpensive and accessible and that the query results be presented in a manner that facilitates searching.

Conventional IR methods for text based documents rely on large, detailed representations of document sets. Documents are represented by an index file that is derived from the terms of the documents through tokenization, stopping, stemming, elimination of capitalization, and inversion. In stopping, common words are eliminated from the document token stream. Tokens which are to be stopped are the most common words in a given language, such as "a" and "the." Stemming strips tokens of certain suffixes such as "ing", "ation" and indications of plurality. Thus "Work", "working" and "works" are represented as "work." Each term in such a full text index ("FTI") serves as an index to the documents in which it appears.

A user searches FTIs by creating term-based queries for documents that include specified keywords. The searches may include term position information. Some methods return all documents containing the specified terms and which have fit the specified term location criteria. Other methods calculate a similarity function between the terms in a query and the terms in each document. Such methods may include a document in a search result as being relevant, even if the document does not fit all the query criteria, as long as the similarity value is greater than a threshold.

Certain FTIs preserve information on the location of terms within documents. This allows users to specify adjacency criteria when searching the document set; i.e., to specify that documents matching a query include instances of terms which are adjacent or in the same sentence, for example.

Such FTI methods require large amounts of storage space. Despite the use of stemming and stopping, virtually every word in the document set must be represented in the index with information on the location of each occurrence of the term in each document in the document set. An FTI may be 50–300% of the size of the document set itself. Generation and maintenance of an index typically requires dedicated computers having processing and storage capacities whose cost is beyond the reach both of those maintaining and those accessing the database. Such indexed document sets are typically available only through services, such as Lexis®/Nexis® and Dialog®, and the available indexes are limited to those document sets for which the costs can be justified.

Because such indexes are costly to generate and take up a large amount of storage space, searching on these indexes is typically performed at a site remote to the user but near the document set. This is because the transmission of the indexes to a user and their storage by a user is impractical. In addition, some FTIs contain enough information to reconstruct the original document set, which may be proprietary. Search performance is dependent on data transmission performance and by the availability and workload of remote processors.

Conventional IR methods have limitations in addition to their resource requirements. By the use of stopping, stemming and elimination of capitalization, these methods eliminate information useful to searching. This information is eliminated in order to genericize terms entered as queries and to lower the storage costs of the indexes. While these methods allow for searching based on phrases comprising more than one token, these phrases may not include information eliminated by stopping, stemming and elimination of capitalization.

Conventional IR methods often require a user to enter an exact representation of a phrase and all its variants (i.e. synonyms) in each search query. This is time consuming for the user, and since a user will typically not have the time to contemplate the existence of such variants, documents containing variants of a phrase may not be found. Furthermore, due to the loss of information as a result of stopping, stemming and capitalization elimination, compound terms (i.e. phrases) are not able to be fully defined. Few conventional IR method allows a definition of a compound term or of the variants of a term to be created prior to any search or other use of that term. For example, conventional IR methods will not allow for the equivalence of "Federal Bureau of Investigation", "FBI" and "Federal Bureau" to be defined before indexing.

Conventional IR methods conduct searching over the text of a document set, using combinations of terms as queries. Conventional IR methods allow for searching and categorization by topic (an area of subject matter or any other categorization); however such methods require that the topics be defined after the documents are indexed.

Some search methods include pre-defined topic definitions as well as term specifications. However, such relevancy determinations typically contain terms which are added to a text search query, where the terms are selected to gather documents relevant to the topic. The topic itself is not evaluated relative to the documents.

Because of the resource requirements of conventional IR methods, and because of their limitations when using topics, it is difficult to integrate these methods with graphical searching and graphical query result representation.

Therefore, there is a need for a more inexpensive and more resource efficient, yet effective, method to search a set of documents. There is a need to perform such a search on a processor which is local to the user and which is remote from the document set. There is a need for metadata providing an efficient and effective search method which allows users to search across different filtering criteria. There is a need for metadata which may allow for graphical searching and graphical query result representation on a local, user processor. There is no method of creating metadata allowing for searching based on phrases which include information normally eliminated by stopping, stemming, and elimination of capitalization or searching based on variants of phrases or terms.

Thus, an improved method for creating, distributing and using document set representations for searching is desirable, and as will be disclosed in more detail below, the present invention provides the desired method as well as other desirable results, which will be readily apparent to those skilled in the art, upon reading the detailed description to follow.

SUMMARY OF THE INVENTION

A method and system are disclosed for creating compact integrated metadata representing a set of documents. Each document comprises a set of terms. The metadata comprises a set of topic profiles, each topic profile defining a relationship between a topic and the documents, a set of document surrogates, and a list of terms which may distinguish among documents. Each document surrogate describes a subset of terms occurring in the document and thus permits a document to be searched for by term as well as topic.

DETAILED DESCRIPTION

I. Overview

Figure 1:
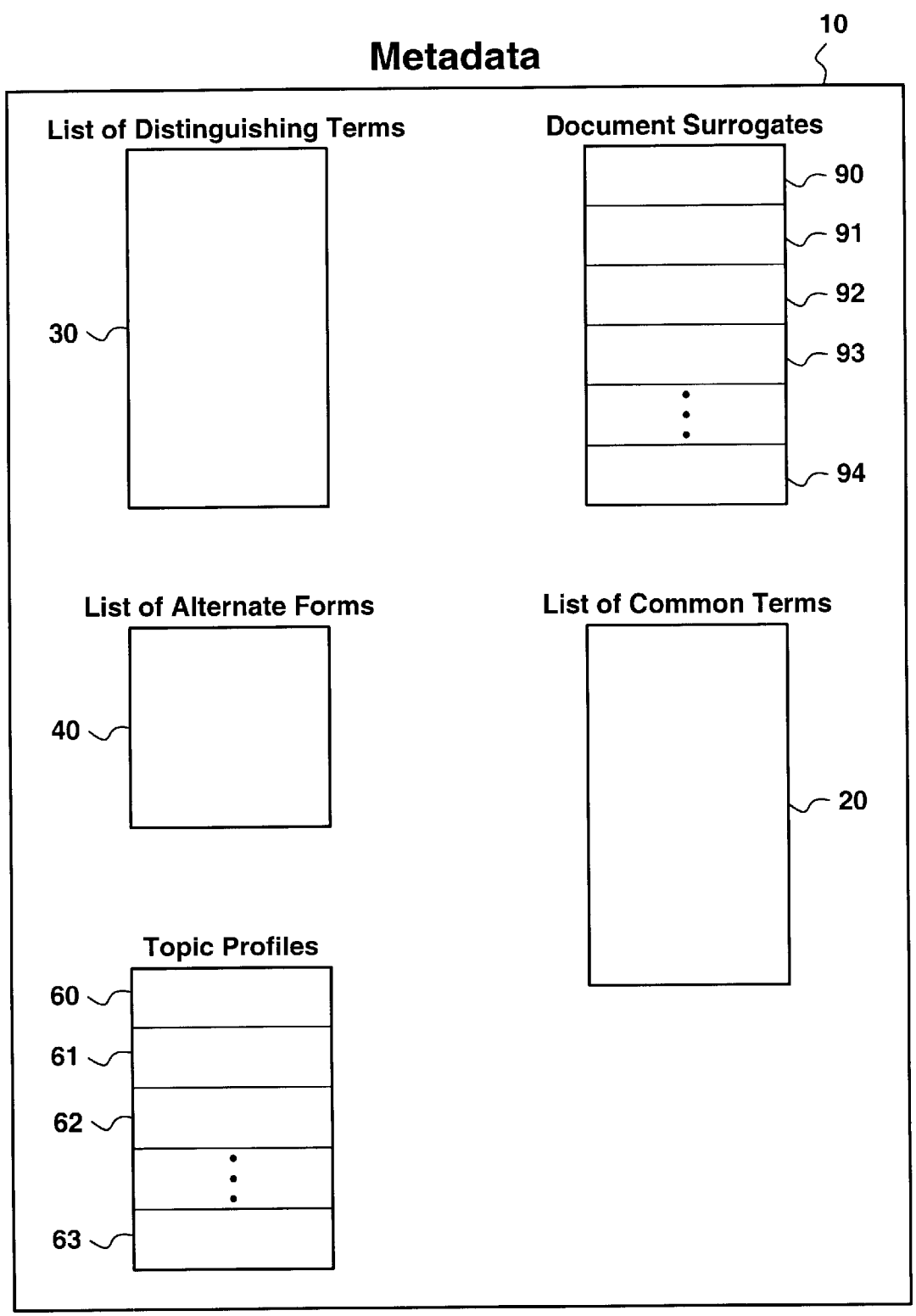
FIG. 1 is a block diagram illustrating the metadata according to an embodiment of the present invention.

The method and system of the present invention create a set of compact integrated metadata from a document set. In the IR art metadata refers to information which may be used to describe, search in, or otherwise analyze a set of data or documents. A conventional FTI is a form of metadata. The compact integrated metadata of an exemplary embodiment of the present invention allows a user to search a document set using more than one filtering method at a client processor which is remote from the actual document set. The compact size of the metadata of the present invention allows a processor local to the user to perform the search, eliminating delays associated with data transmission and remote processor workloads. That the search may be performed locally allows the state of search to be maintained on the local processor and applied to subsequent queries. The metadata may be filtered before being presented to the user to further reduce the size of the metadata and to focus the metadata based on user requirements.

The method and system of the present invention create integrated metadata, in which different types of search information about a set of documents is combined to allow efficient yet powerful searching of the set of documents. In an exemplary embodiment of the present invention each document is a file comprising text information. As used herein, documents may comprise other information in addition to text information, and may be web pages, legal decisions or any other collection of text and data.

In an exemplary embodiment, the metadata of the present invention is derived by a server processor from a document set stored on or near the server. The metadata is distributed to client processors for searching. Query results are ranked lists of documents, and users may refer to the original document set, located remotely from the client processor, for the full set of information contained within the documents.

The metadata of the present invention is a compact representation of the original set of documents, taking up approximately 1–5% of the storage space required for the document set. This allows the metadata to be easily distributed to a local processor for searching. Furthermore, the proprietary content which allows some FTIs to be used to reconstruct the original document set is not contained in the metadata of the present invention. In an exemplary embodiment of the present invention, the metadata does not contain detailed information on term position which exists in conventional IR indexes. The actual documents, which may be proprietary, are usually maintained at a distance from the user, who must query the server processor to get access to these documents.

The compact integrated metadata of the present invention allows searching on the document set using more than one filtering criterion at the same time. In an exemplary embodiment of the present invention the metadata allows a document set to be searched by term information—the text of the documents—as well as topic information.

A topic may be an area of subject matter or interest—for example, "Kites" or "Object Oriented Programming." As used herein, a topic may also be any definition allowing documents to be categorized and separated. In an exemplary embodiment of the present invention, topics may be applied automatically to documents to provide ratings indicating varying degrees of relevance.

The term information contained in the metadata allows for searching based on compound terms, which are strings of tokens—i.e., phrases. The metadata of the present invention is highly efficient in that much of the information from the original document set is not included in the metadata, while information useful to searching is retained. Compound terms retain information lost through the stopping, stemming and elimination of capitalization which occurs when the metadata is created. When used herein, a "token" is an individual word, number, symbol or punctuation mark appearing in an original document. When used herein, "term" includes both tokens and compound terms. Terms in the metadata—both compound terms and tokens—are given alternate forms, externally defined equivalents, which allow users to search without explicitly defining every variant of a term. According to an exemplary embodiment of the present invention, terms appearing in documents may be represented in the metadata differently from their verbatim representation in the original document—for example, in a stemmed form or in a normal form, which is a standardized form of a term which may have multiple forms. As used herein, "term" may refer to any form of a term—for example, its stemmed, root form or an alternate or normal form of a term.

II. Compound Terms and Alternate Forms of Terms

In an exemplary embodiment of the present invention the terms in the metadata may be tokens or compound terms, which are strings of tokens—i.e., phrases. A token may be a term which is to be stopped; such tokens are the most common words in a given language and thus are not useful for searching.

Conventional IR methods may require a user to enter an exact representation of a term and all its variants in each search query. Conventional IR methods utilizing variants of terms allow for their use only after indexing is performed. The method and system of the present invention allow terms to have pre-defined alternate forms, and allow for such forms to be defined without reference to documents on which the forms may be used. Conventional methods may also eliminate information from the index which is useful in defining compound terms. The method and system of the present invention allow compound terms and alternate forms to be defined prior to being searched, and allow their use to be transparent to the user.

Creating compound terms and alternate forms of terms prior to searching makes creating queries easier and faster for users, who do not have to define all forms of compound terms and variants of terms in queries. Users do not need to know of the existence of such terms to gain the benefit of their use.

Compound terms allow for the recognition of terms which can be described in a document as two or more tokens having a specified spatial relationship. The definition and use of compound terms allows for terms which are strings of one or more tokens to be treated as one term. For example, "Federal Bureau of Investigation" may be represented across documents and for the purpose of searching as one term. Unlike a conventional FTI, the metadata of the present invention lacks much information on term location. Thus allowing the metadata to include compound terms allows searching on phrases. Further, such phrase searching is easier and more powerful than searches using FTIs, as the compound terms of the present invention are pre-defined, may include alternate forms, and include information conventional methods strip away using stemming, stopping and elimination of capitalization. In an exemplary embodiment of the present invention, compound terms are listed as strings in a list of compound terms.

The method and system of the present invention allow for creating metadata for searching on terms having multiple, alternate forms. Such terms are represented in a standard manner. Thus "Federal Bureau of Investigation" is represented in a standard manner if it appears across documents or searches in different ways, such as "FBI" or "Federal Bureau". Not all terms have alternate forms. For those terms having alternate forms, the term is referred to by a normal form, a string corresponding to one form of the term, or by a token corresponding to the normal form. The normal form of such a term may be its most common form. In an exemplary embodiment of the present invention, alternate forms of terms are listed in a list of alternate forms. The list of alternate forms is a list of lists of strings of alternate forms of terms. Allowing the metadata to include alternate forms of terms eliminates the need for a user to include all variants of terms in a search query.

In an exemplary embodiment of the present invention, tokens which can be stemmed are stored and used in their root form. Stemming strips tokens of certain suffixes such as "ing", "ation" and indications of plurality. Thus "work", "working" and "works" are represented as "work." An occurrence of a stemmed variant such as "working" in a document or in a user search entry is processed and stored as if it were equivalent to the token "work." Furthermore, tokens that are not defined as compound terms or alternate forms are stored with capital letters converted to lower case.

III. The Metadata

An exemplary embodiment of the method and system of the present invention creates compact integrated metadata comprising information allowing a set of documents to be searched based on both the topics relevant to the documents and the text contained in the documents. The metadata is a reduced representation of the document set, taking up a fraction of the storage space of the document set. The document set may or may not be related by subject area. The metadata is searched using a query entered by the user containing topics to be searched and keywords of text to be searched.

Referring to the figures in which like numerals indicate like elements, FIG. 1 is a block diagram illustrating the metadata 10 according to an embodiment of the present invention. In an exemplary embodiment of the present invention the metadata 10 comprises a list of common terms 20, for providing more accurate searching, a list of distinguishing terms 30 for determining which documents in the document set contain a given term, and a list of alternate forms 40 for allowing terms to be represented in multiple forms. Metadata 10 further comprises a set of document surrogates 90–94, one surrogate for each document in the original set of documents. Each document surrogate 90–94 is a reduced representation of a document in the original document set, and describes the document to a user, allows the document to be located, and allows the document to be searched using the metadata 10 of the present invention. Metadata 10 includes a set of topic profiles 60–63, each topic profile 60–63 describing a topic and allowing a determination to be made as to how much a given document relates to the topic.

Figure 2:
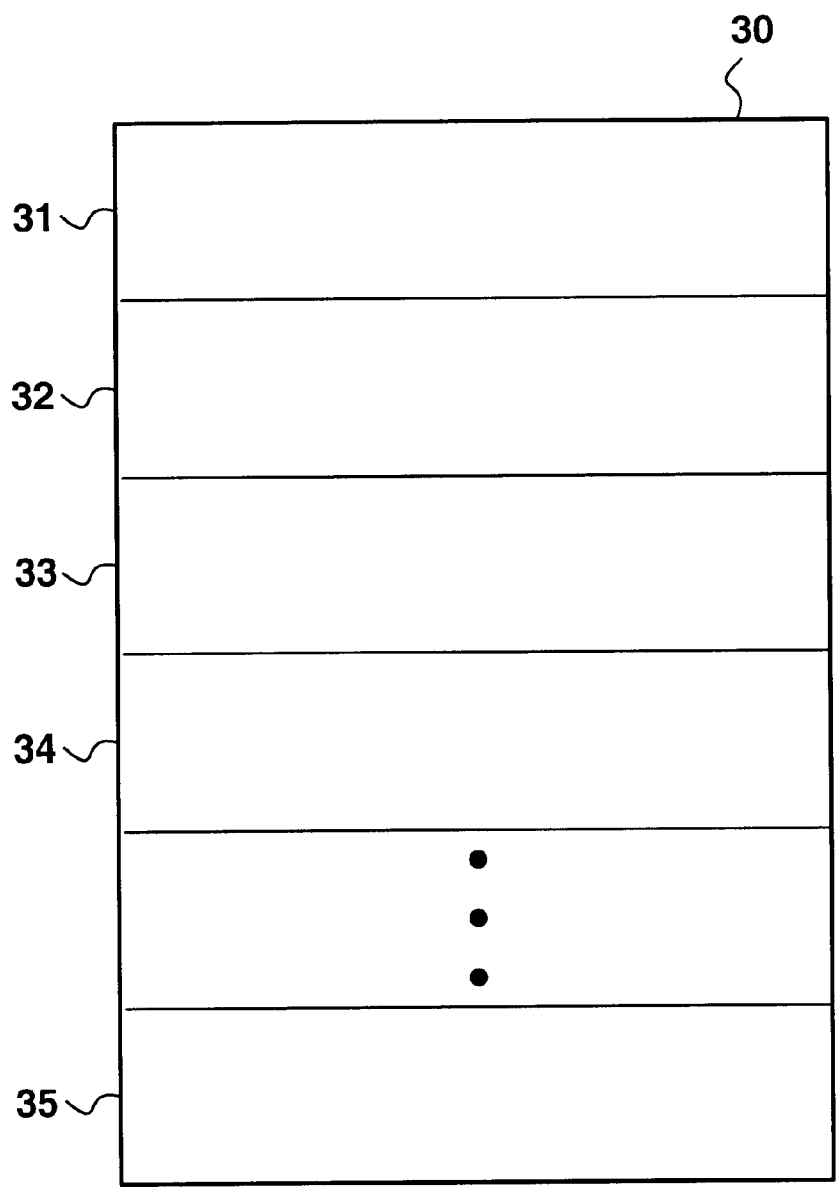
FIG. 2 is a block diagram illustrating the list of distinguishing terms of FIG. 1 according to an embodiment of the present invention.

FIG. 2 is a block diagram illustrating the list of distinguishing terms 30 of FIG. 1 according to an embodiment of the present invention. The list of distinguishing terms comprises terms 31–35 which may be used to search the documents. In an exemplary embodiment of the present invention, these terms are useful in searching because they are the least common terms in the document set, and thus may distinguish among documents. Terms are stored in the list of distinguishing terms 30 in order of their frequency of occurrence in the document set, from most to least frequent. This allows for better encoding of the list of distinguishing terms 30, and allows for terms in the list of distinguishing terms 30 to be referenced using a space saving method similar to a Huffman encoding method. Such a method allows pointers to terms occurring more frequently in a data set to be encoded using fewer bits than those occurring less frequently.

In an exemplary embodiment of the present invention, the lists of common terms 20 and distinguishing terms 30 are generated automatically by a server processor, local to the actual document database. The union of the list of common terms 20 and the list of distinguishing terms 30 comprises all (non-stopped) terms in the document set, presented in their normal form or in their stemmed and un-captilalized form. The terms in the latter list are those that are less common in the document set than those in the former list. In an exemplary embodiment the size of the list of distinguishing terms 30 may be pre-set, for instance to 65,535 entries, or may be determined according to the number of terms in the document set. The list of common terms 20 is of unlimited size. In an exemplary embodiment, terms are stored in the list of distinguishing terms 30 in order of frequency, from most to least frequent. Thus the list of distinguishing terms 30 is the list of the N least common terms in the set of documents, where N is the pre-set or determined size for the list. Unlike prior art IR methods, all uncommon terms are considered distinguishing, even if they appear in as few as one of the documents.

All terms in the metadata may be compound terms. In an exemplary embodiment, a compound term is represented as a list of tokens, i.e., a string, which is the normal form of the compound term, or by a token corresponding to the normal form. A token is represented in the metadata by the token itself (i.e., the actual word), a token representing a normal form of the term, or by a pointer to the token. Tokens which may be stemmed are represented in their root form. Stemming strips tokens of certain suffixes such as "ing", "ation" and indications of plurality. Tokens are stored with capital letters converted to lower case.

Figure 3:
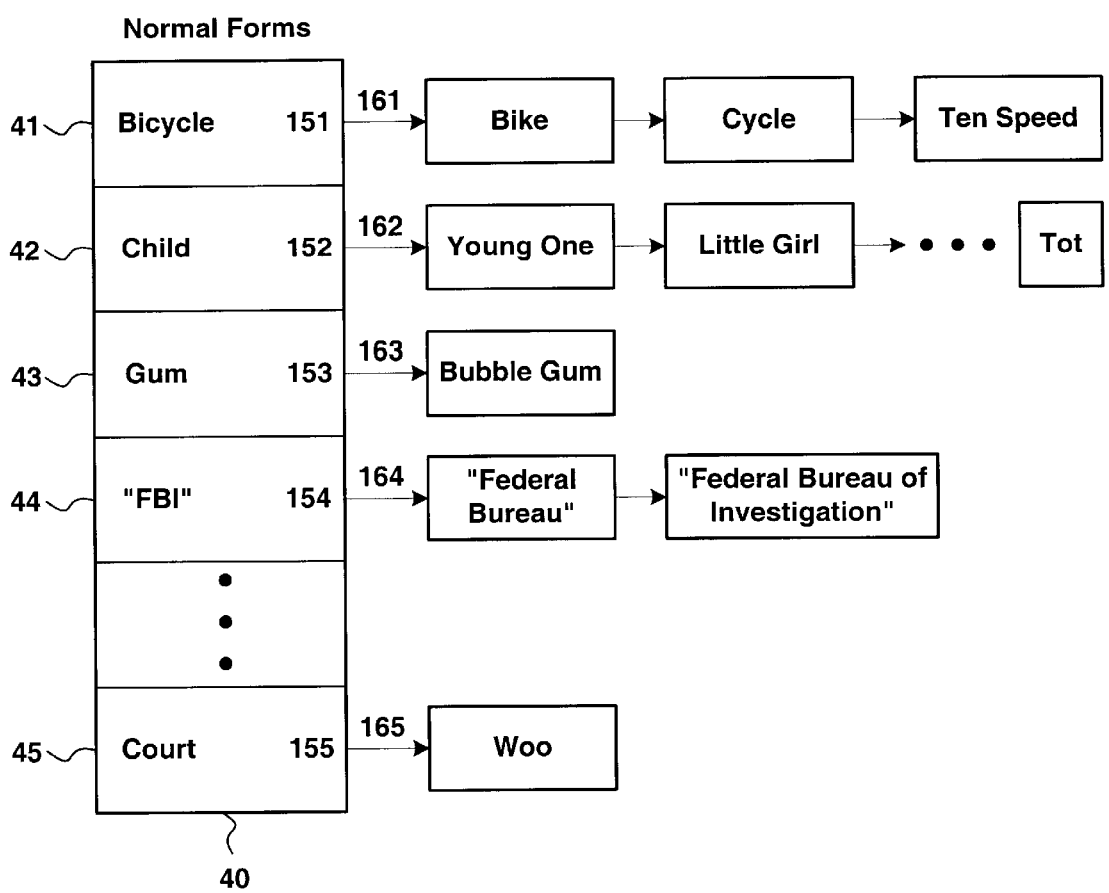
FIG. 3 is a block diagram illustrating the list of alternate forms of FIG. 1 according to an embodiment of the present invention.

FIG. 3 is a block diagram illustrating the list of alternate forms 40 of FIG. 1 according to an embodiment of the present invention. For each term in the document set having alternate forms, an entry 41–45 exists in the list of alternate forms 40. The head 151-55 of each entry is a string corresponding to the normal form of the term. The remainder 161-65 of each entry is a list of strings representing variations of that term. Strings which are bracketed by quotation marks (" ") are alternate forms which are to be identified before stopping, stemming and capitalization elimination occur. Strings not so indicated are identified after stopping, stemming and capitalization elimination occur. In an exemplary embodiment the strings are connected by pointers leading in one direction from the head of the list to the last entry. However, other structures may be used to form the lists.

In an exemplary embodiment of the present invention, all terms in the metadata (both compound terms and tokens) may have alternate forms. Terms with alternate forms are represented in the lists of common terms 20 and distinguishing terms 30, and in document surrogates 90–94, in their normal form or as a token representing the normal form. The normal form of the term is a standardized form for referring to the term. The actual term appearing in the original document may be an alternate form of the term.

Figure 4:
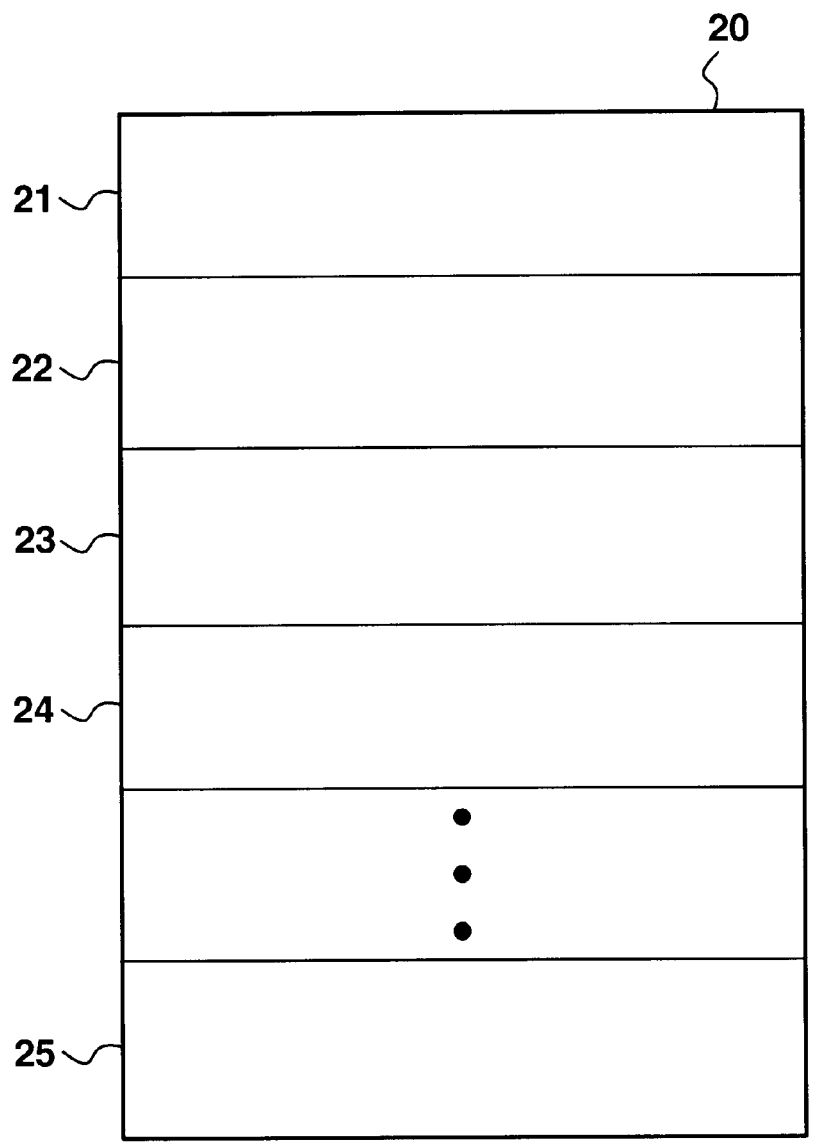
FIG. 4 is a block diagram illustrating the list of common terms of FIG. 1 according to an embodiment of the present invention.

FIG. 4 is a block diagram illustrating the list of common terms 20 of FIG. 1 according to an embodiment of the present invention. The list of common terms 20 comprises terms 21–25 which occur frequently in the document set relative to distinguishing terms, and are thus less useful than distinguishing terms in distinguishing among the documents, given a large document set size. In an exemplary embodiment of the present invention, during searching, the list of common terms 20 eliminates the need for an assumption resulting in false positives. Without the use of the list of common terms, when a term appears in a query which is not in the list of distinguishing terms 30 or alternate forms 40 the search process must either assume none of the documents contain the term, resulting in false negatives (where the search process does not return documents that fit the intended search criteria), or assume all of the documents contain the term, resulting in false positives (where documents are returned that do not fit the intended criteria). The system and method of the present invention assumes only that terms in the list of common terms 20 are in all documents; thus the assumption is made only for certain terms. During searching on the metadata 10, only terms in the list of distinguishing terms 30 and list of alternate forms 40 are used to return specific documents. If a term in the query is not in either of the list of distinguishing terms 30 or the list of alternate forms 40, its appearance in the list of common terms 20 prevents documents from being rejected from the query results because the documents lack the term. Terms in a query not occurring in any of the list of distinguishing terms 30, list of alternate forms 40 and list of common terms 20 may result in rejection of a document from a search result, or the lowering of the ranking of a document in a query result.

Figure 5:
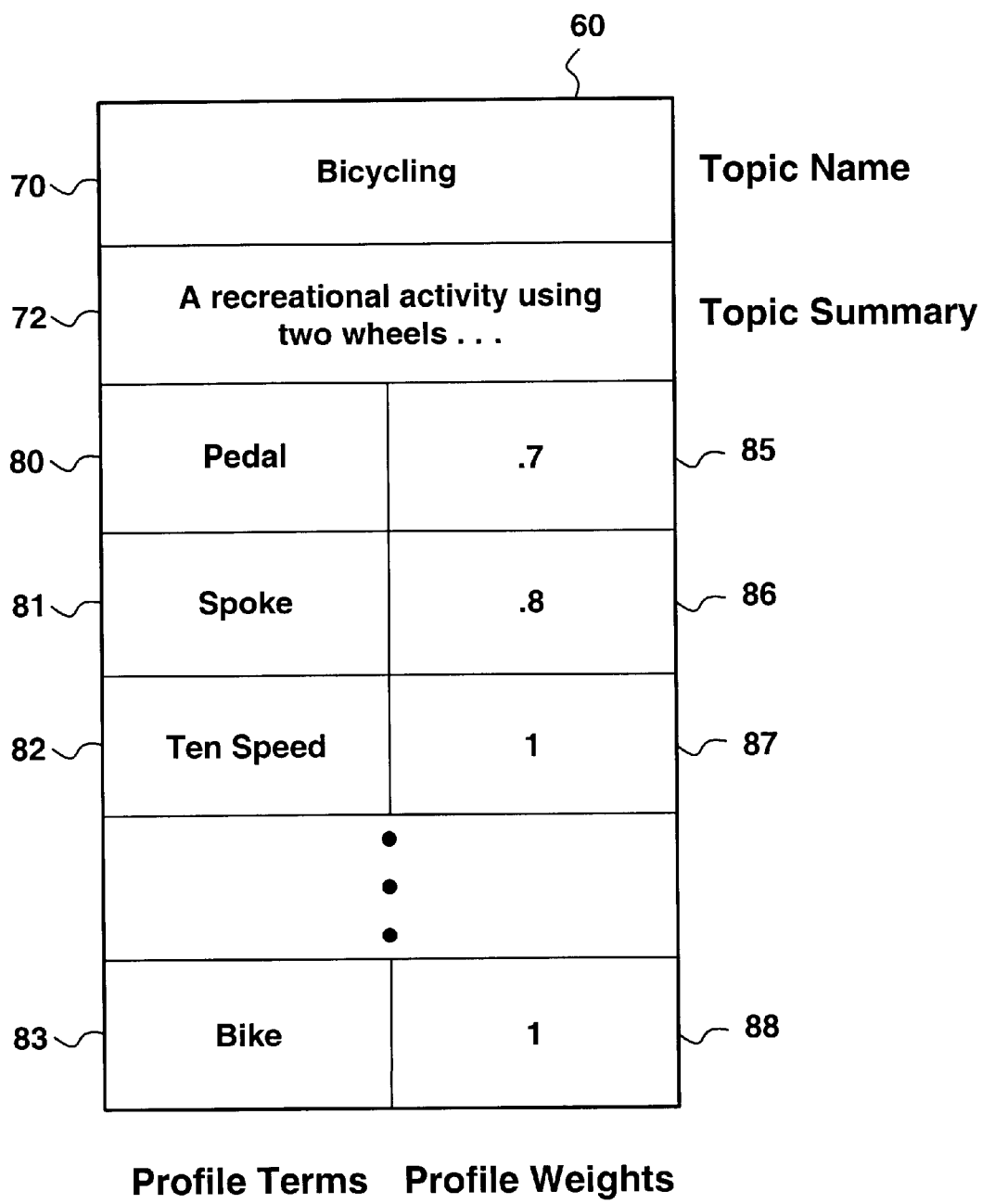
FIG. 5 is a block diagram illustrating a topic profile of FIG. 1 according to an embodiment of the present invention.

FIG. 5 is a block diagram illustrating a topic profile 60 of FIG. 1 according to an embodiment of the present invention.

Each topic profile 60 describes a topic in such a manner as to allow a determination to be made as to how much a given document relates to the topic. A topic is an area of subject matter or interest—"Kites" or "Object Oriented Programming," for instance. A topic may also be any definition allowing documents to be categorized and separated. Each topic profile 60 comprises a topic name 70, identifying the topic profile, a topic summary 72, providing a brief text description of the topic, and a set of profile terms 80–83, for determining the relevancy of the topic to a document. Each profile term 80–83 which has more than one form or which is a compound term is represented in topic profile 60 as the normal form of that term.

In an exemplary embodiment of the present invention each profile term 80–83 in topic profile 60 has a corresponding weight 85–88, allowing the relevance of the topic to a document to be measured and quantified based on the occurrence of profile terms in the document. The weight allows the profile term to be used to evaluate the relevance of a given document to the topic of topic profile 60. In an exemplary embodiment, the weight is a number which is considered relative to other term weights, and representing the relevance of a document containing that term to the topic of topic profile 60. In an exemplary embodiment, to determine the relevance of a document to a topic, for each profile term appearing in the document surrogate, a relevancy rating is increased by the weight corresponding to that profile term.

In alternative embodiments, the weight may allow for a more complex evaluation. For example, in addition to having a numerical weight, the profile term may provide an indication that the existence of the term in a document is either necessary or sufficient for that document to pass a threshold level of relevance to the topic. In other embodiments, topic profiles 60–63 may be created in a hierarchy of topics and sub-topics. In such embodiments a topic profile may include as its definition the terms included in its sub-topics.

In an exemplary embodiment of the present invention, metadata 10 comprises a set of document surrogates 90–94, one document surrogate for each document in the original set of documents. Each document surrogate 90–94 corresponds to a document in the original document set and is a reduced representation of that document. The document surrogate describes the document to a user, allows the document to be located in the document set, and allows the document to be searched for using the metadata 10 of the present invention. Document surrogates 90–94 allow for searching the set of documents based on the terms of the document, and in addition allow the documents to be analyzed and categorized by relevancy to different topics.

Figure 6:
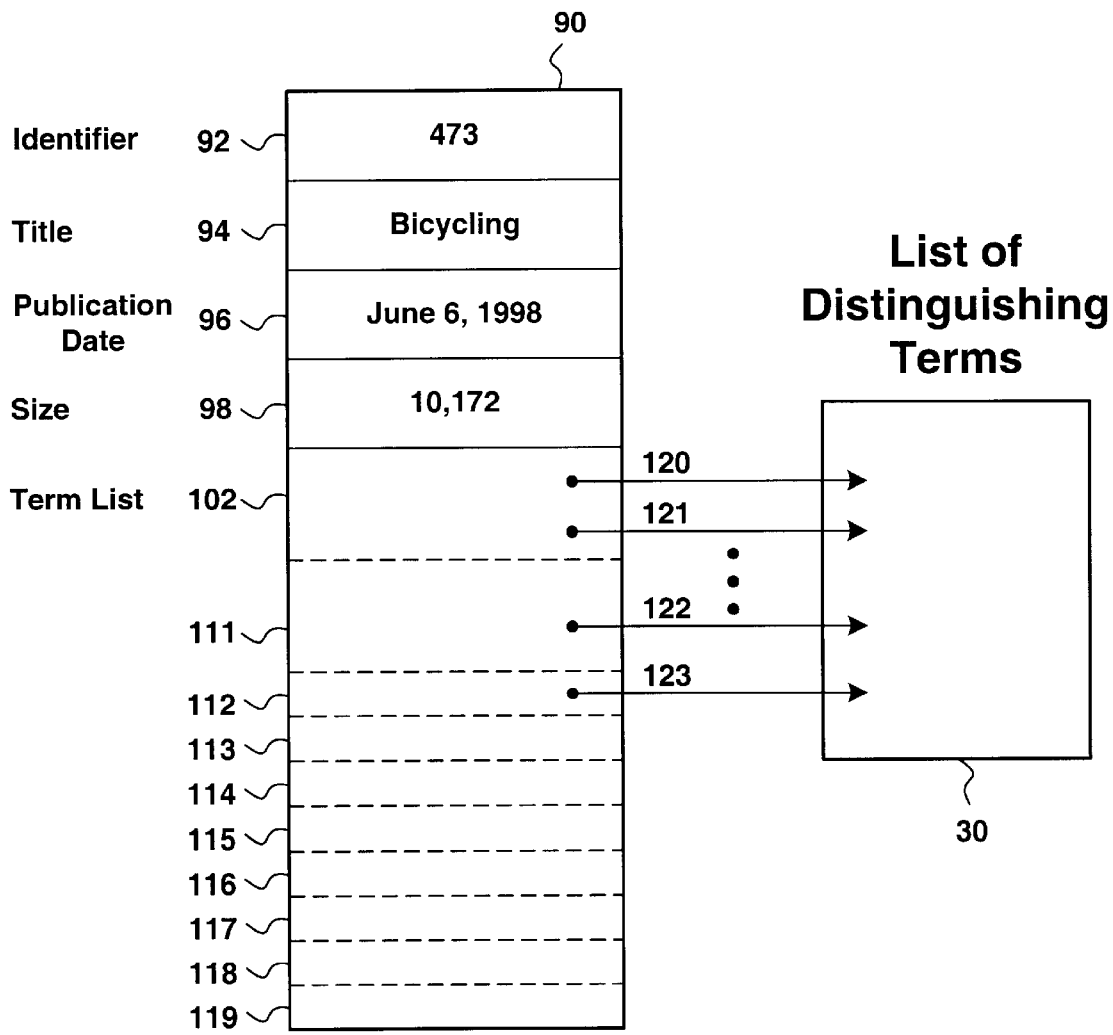
FIG. 6 is a block diagram illustrating a document surrogate of FIG. 1 according to an embodiment of the present invention.

FIG. 6 is a block diagram illustrating a document surrogate 90 of FIG. 1 according to an embodiment of the present invention. Document surrogate 90 includes a term list 102 of terms contained in the corresponding document, which is used in searching the document set. Each document surrogate 90 includes an identifier 92, for retrieving the document from the original document set, a title 94, a publication date 96 and the size 98 of the document. In an exemplary embodiment the size 98 is expressed in bytes.

In an exemplary embodiment of the present invention document surrogate 90 includes a term list 102 of terms used in the document, separated by term list separators 111-19. The term lists in the document surrogates allow for searching of the list of documents by the terms in the documents. In an exemplary embodiment term list 102 consists of a sequence of entries, one entry for the first occurrence of each term in the document corresponding to the surrogate. Entries occur in term list 102 in the order in which their corresponding terms first appear in the document. Entries are pointers 120-23 to the normal forms of the terms in the list of distinguishing terms 30. In an exemplary embodiment, term list pointers 120-23 are references coded using a method similar to a Huffman method, referring to the list of distinguishing terms 30. As used herein, a reference may be any method or data structure for referring to another data structure, including a pointer, index number, address or title.

Term list separators 111-19 separate term list 102 into zones. Zones are useful during a document search, as a term first appearing near the beginning of a document is a better indication of the subject matter of the document than a term first appearing near the end of a document. Dividing the term list into zones provides a low cost manner of indicating the importance of a term to a document. In an exemplary embodiment of the present invention the term list in a document surrogate is divided into ten zones of substantially equal size by nine term list separators.

In an exemplary embodiment of the present invention document identifier 92 is a record number allowing the document to be retrieved from the text database. In alternate embodiments of the present invention, document identifier 92 may be any way to uniquely identify the document—a web site address, a legal case name, etc. Document surrogate 90 may include in addition to publication date 96 additional dates such as the date of the most recent update or edit of the document. Document surrogate 90 includes in alternative embodiments the number of images, if any, contained within the document, and may contain an abstract of the document, which may be generated manually, by a human operator, or automatically. Machine based abstract generation methods are well known.

Alternative embodiments of the present invention need not use compound terms or alternate forms, but may rely instead on tokens only, with or without alternate forms. The term lists in the document surrogates may utilize terms themselves instead of pointers, may utilize alternative methods to divide the term list into zones and may provide for alternate numbers of zones. In other embodiments, alternate forms may be listed using different data structures.

IV. Method and System for Creating Metadata

Figure 7:
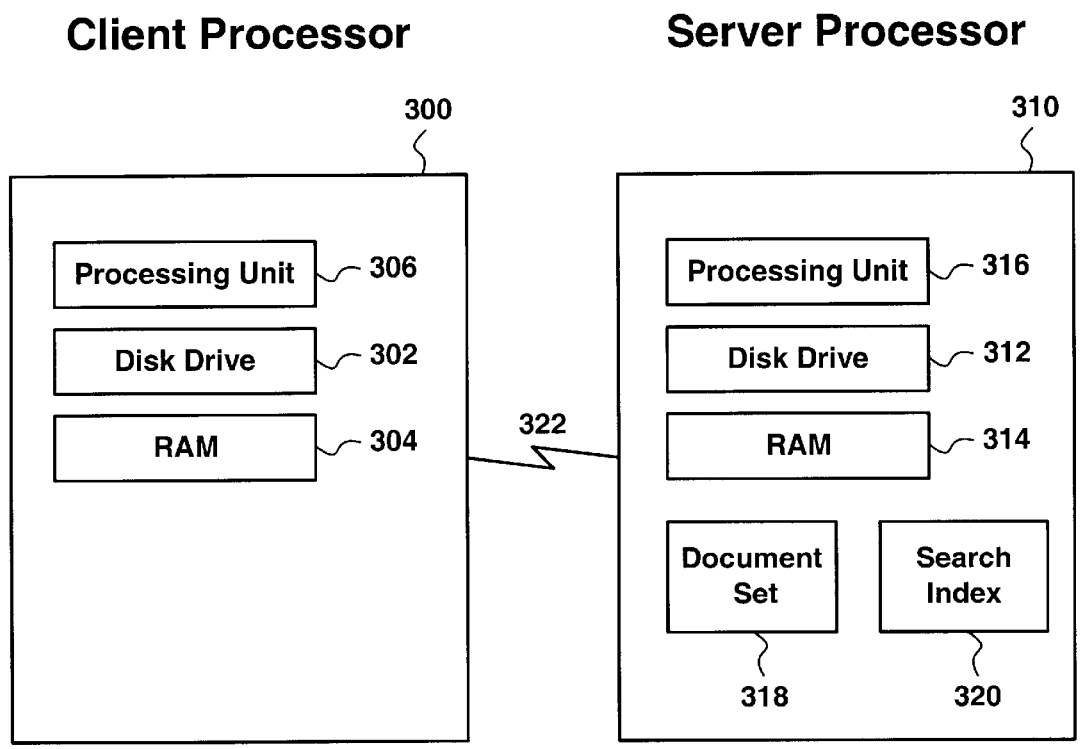
FIG. 7 is a block diagram illustrating a computer system according to an embodiment of the present invention.

The method and system of the present invention can be implemented using hardware, software (with stored instructions directing a processor or processors), or both hardware and software. FIG. 7 is a block diagram illustrating a computer system according to an embodiment of the present invention. Client processor 300 includes disk drive 302, for storing data in the form of a plurality of files, random access memory ("RAM") 304, providing non-permanent storage of data and program instructions, and processing unit 306 for executing instructions and controlling the operation of client processor 300. Likewise, server processor 310 includes disk drive 312, for storing data in the form of a plurality of files, RAM 314, providing non-permanent storage of data and program instructions, and processing unit 316 for executing instructions and controlling the operation of server processor 310. Server processor 310 may store a set of documents 318 and a document search index 320 for searching on the set of documents. Document search index 320 may be, for example, an FTI. Document set 318 and document search index 320 need not be stored on server processor 310. Communications link 322 allows client processor 300 and server processor 310 to communicate.

In an exemplary embodiment of the present invention, a set of metadata 10 (FIG. 1) is created from the set of documents 318 at server processor 310. Server processor 310 is typically either physically close to the set of documents 318, or connected to the set of documents 318 via a high bandwidth connection.

Figure 8:
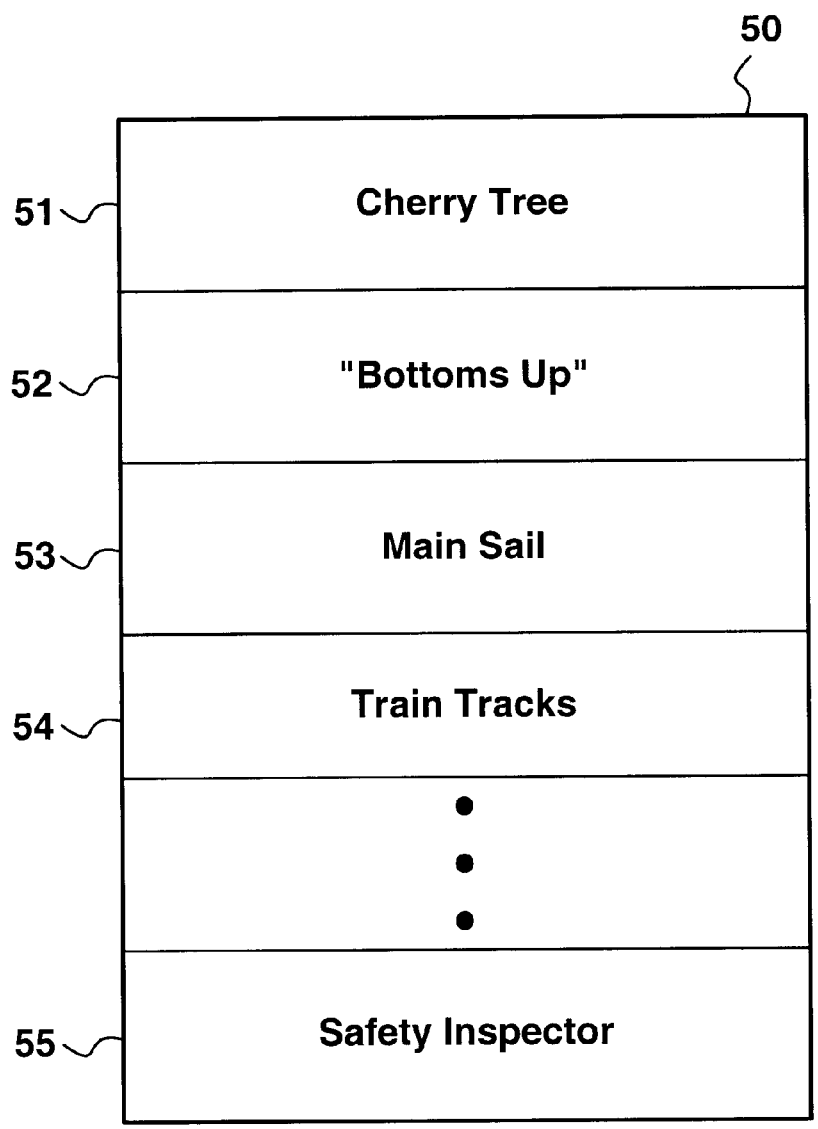
FIG. 8 is a block diagram illustrating the list of compound terms according to an embodiment of the present invention.

The user creates a set of topic profiles 60–63, a list of alternate forms 40 and a list of compound terms 50 (FIG. 8). FIG. 8 is a block diagram illustrating the list of compound terms 50 according to an embodiment of the present invention. The list of compound terms 50 comprises compound term definitions 51–55. Each compound term definition 51–55 is a string. Strings which are bracketed by quotation marks (" ") are compound terms which are to be identified before stopping, stemming and capitalization elimination occur. Strings not so indicated are identified after stopping, stemming and capitalization elimination occur. Compound term definitions 51–55 are used when creating metadata 10 to recognize compound terms.

In an exemplary embodiment, individual tokens for which it is desirable to preserve information lost through stopping, stemming and capitalization elimination may be represented in the list of compound terms 50 as the token bracketed by quotes. The normal form of such single token compound terms is the token itself. For example, it may be desirable to represent the word "Federated" as such a term; capitalization elimination and stemming may otherwise reduce the term to "federate."

After server processor 310 has available the set of topic profiles 60–63, the list of compound terms 50 and list of alternate forms 40, server processor 310 creates the document surrogates 90–94, the list of common terms 20 and the list of distinguishing terms 30. As part of creating document surrogates 90–94, server processor 310 creates pointers 120-23 to entries in the list of distinguishing terms 30.

In order to create metadata 10, server processor 310 tokenizes each document in the set of documents 318. As used herein, tokenization refers to conversion of a document into a stream of tokens and punctuation marks, symbols, etc. As the document is tokenized, compound terms, alternate forms, tokens, and terms to be stopped are identified. Compound terms and tokens are added to the list of common terms 20, if required. These terms may have entries created for them in a document surrogate, and, for the duration of the tokenization process, may have the frequency of their occurrence recorded.

In an exemplary embodiment of the present invention, to create the list of common terms 20 and list of distinguishing terms 30, terms produced from the tokenization of the documents first are added to the list of common terms 20. After all documents have been tokenized, the list of common terms 20 is separated into the list of distinguishing terms 30 and the list of common terms 20, based on the frequency of occurrence of each term in the set of documents 318. At this point, entries in document surrogates 90–94, described below, pointing to terms in the list of common terms 20, are removed.

Figure 9:
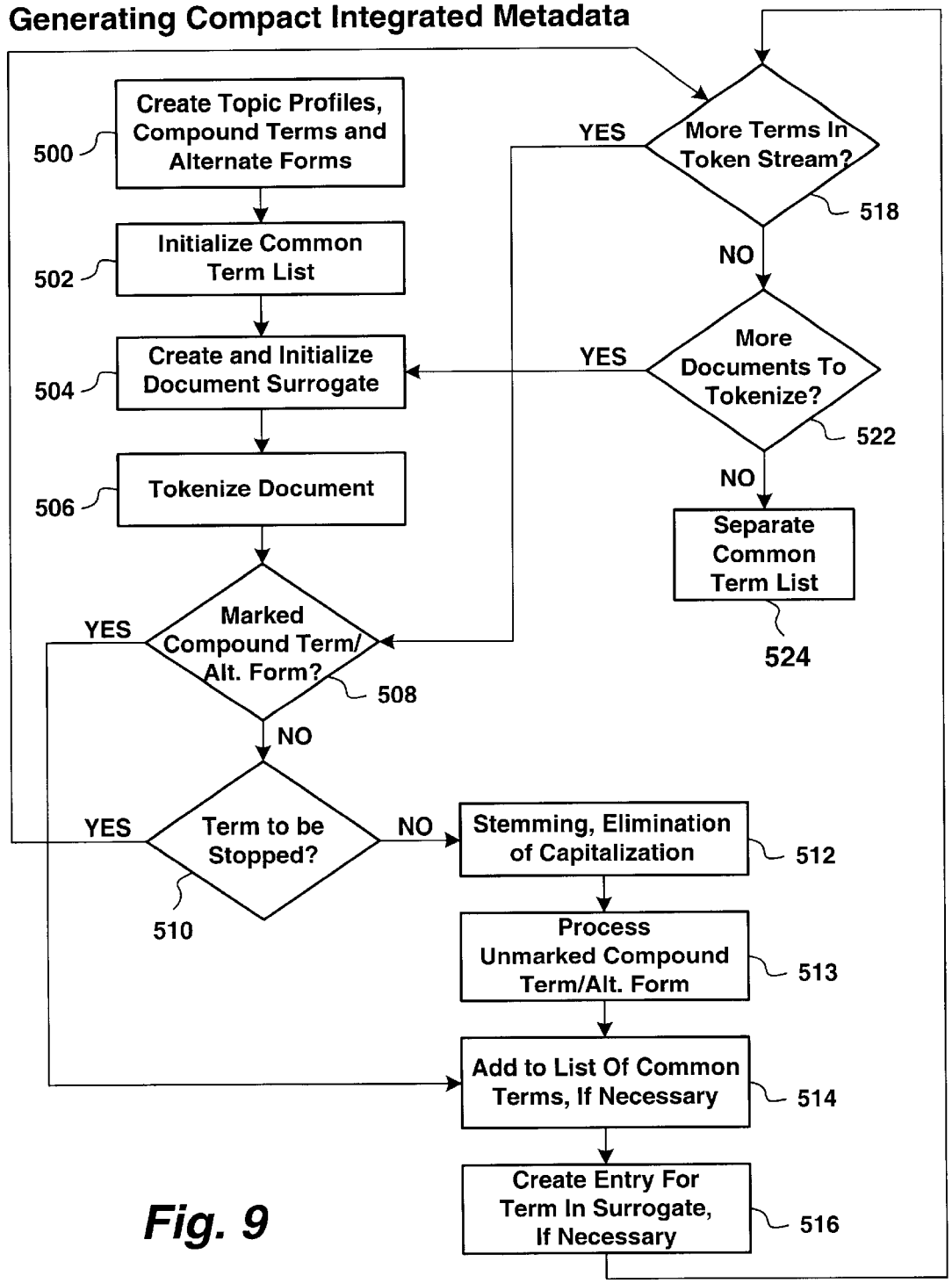
FIG. 9 is a flow chart illustrating the operation of the method for generating the metadata in FIG. 1 according to an embodiment of the present invention.

FIG. 9 is a flow chart illustrating the operation of the method for generating compact integrated metadata 10 of FIG. 1 according to an embodiment of the present invention.

Referring to FIG. 9, in step 500 a user creates a set of topic profiles 60–63, the list of compound terms 50 and the list of alternate forms 40. The topic profiles 60–63 and list of alternate forms 40 are added to the metadata. In an exemplary embodiment, the list of compound terms 50 need not be included in the metadata 10, as the lists of common terms 20 and distinguishing terms 30 contain all relevant compound terms contained in the document surrogates 90–94.

In creating these data structures, the user may be aided by software. For instance, software might aid in the identification and definition of compound terms. Software tools might identify terms which appear often across a set of documents which a user has defined as concerning the same topic, in order to aid in creating profile term lists for topic profiles.

While the data structures of an exemplary embodiment of the present invention which constitute topic profiles 60–63 and lists of compound terms 50 and alternate forms 40 are described herein, methods for allowing users to create data structures such as these are known. In alternate embodiments, the user does not need to create this data at the time server processor 310 creates the document surrogates 90–94; topic profiles, compound terms and alternate forms which are created beforehand may be used. Topic profiles 60–63, compound terms and alternate forms which are components of a set of metadata 10 may be created at different times.

In step 502 server processor 310 initializes the list of common terms 20. The list of common terms 20 is initially null.

In steps 504-22, server processor 310 iterates through the documents in the document set to produce a list of document surrogates 90–94. For each document a document surrogate is created. After completion, a document surrogate is a reduced representation of the document which describes the document to a user, allows the document to be located, and allows the document to be searched using the metadata 10 of the present invention.

In step 504 server processor 310 creates and initializes a document surrogate for a document in the document set.

Server processor 310 adds to the current document surrogate a unique identifier for retrieving the corresponding document from the original document set corresponding to the surrogate, the title of the document, the size of the document in bytes, and the publication date of the document. In alternative embodiments, server processor 310 may add additional dates such as the date of the most recent update or edit of the corresponding document and may add the number of images, if any, included within the document.

In step 506 server processor 310 tokenizes the current document, converting it to a stream of tokens. In an exemplary embodiment server processor 310 divides the resulting token stream into zones using document token list separators. Nine document token list separators are used to divide the token stream into ten zones, each zone having substantially the same number of tokens. Dividing the document surrogate into zones provides a low cost manner of indicating the importance of a term to a document. Tokens or terms appearing earlier in a document (and thus in earlier zones) are considered to be more relevant in describing or summarizing the document. In creating the term list for the document surrogate, information on the zone in which each term first appeared in the original document is kept in order to gauge the relative importance of the term to the subject matter of the document.

In step 508, server processor 310 identifies certain compound terms and alternate forms in the document token stream. In an exemplary embodiment of the present invention, when a term is identified in a document, it is first determined if the term is a part of a compound term or an alternate form which has been marked to be recognized before capitalization elimination, stemming, and the elimination of terms to be stopped. In an exemplary embodiment, each compound term alternate form is marked in the list of compound terms 50 and the list of alternate forms 40, respectively, in a way that allows marked terms to be recognized before information is eliminated by capitalization elimination, stemming, and the elimination of terms to be stopped. Such terms are enclosed in quotation marks (" ") in the list of compound terms 50 and the list of alternate forms 40; other methods of so marking these terms may be used. It may be desirable to have certain compound terms and alternate forms recognized after capitalization elimination, stemming, and the elimination of terms to be stopped; such terms are not so marked.

Server processor 310 refers to the list of compound terms 50 to determine if a term is a marked compound term, and to the list of alternate forms 40 to determine if a term is a marked alternate form. Detecting compound terms and alternate forms (those that are marked) is performed before stopping, stemming and elimination of capitalization are carried out, as these terms may be comprised of terms to be stopped, may require capitalization and may require information for their definition which is lost by stemming. If the term is such a term server processor 310 replaces the token or tokens comprising the term in the token stream with a token representing the normal form of the term and proceeds to step 514; if not server processor 310 proceeds to step 510. The token for the normal form of a compound term is derived the compound term itself—for example, the token representing the normal form of "bicycle chain" may be "% bicycle_chain". Similarly, the token for the normal form of an alternate form is derived from the normal form of the alternate form.

In one embodiment each term in the list of alternate forms 40 and list of compound terms 50 may include an indication of whether or not the term's component tokens should be removed from the token stream when the normal form token for the term is added to the token stream. If such an indication exists, the normal form token replaces the component tokens in the token stream. If no such indication exists, both the normal form tokens and the component tokens remain in the token stream.

In step 510, if the term is not a marked compound term or alternate form, it is determined if the term is one to be stopped. Stopped terms are typically the most common several dozen words in the language of the document set. If the document set is in English, terms to be stopped may include "the", "a" and "to". If the term is a term to be stopped it is ignored, and server processor 310 proceeds to step 518.

In step 512, if the current term is not a marked compound term, a marked alternate form or a term to be stopped, it is stemmed, if necessary, and has its capital letters converted to lower case. Stemming reduces the term to its root form. Alternate embodiments of the present invention may operate without the use of stemming, stopping and capitalization elimination, or may perform these functions in different ways.

In step 513, server processor 310 identifies compound terms and alternate forms in the document token stream which were not marked to be identified before stopping, stemming and capitalization elimination. Server processor 310 refers to the list of compound terms 50 to determine if a term is a compound term, and to the list of alternate forms 40 to determine if a term is a alternate form. If the term is such a term server processor 310 replaces the token or tokens comprising the term in the token stream with a token representing the normal form of the term.

In step 514, server processor 310 performs a search over the list of common terms 20 to determine if the current term has been added to the list. If the term has not been added to the list of common terms 20, it is added to that list, along with a frequency indicator, initially set to one. The frequency indicator for each term in the list of common terms 20 indicates how often the term has been detected in the set of documents. If the current term exists in the list of common terms 20, the term is not added to the list, but instead the frequency indicator of that term is incremented, to indicate that another instance of that term has been identified in the document set. The frequency indicator is used to create the metadata but is not included as part of the metadata. The term may be added to the list as the token representing the normal form of a compound term or alternate form.

In step 516, an entry is created for the current term in the term list of the current document surrogate, if necessary. Only the first occurrence of a term is included in each document surrogate. In an exemplary embodiment, the entry comprises a pointer to the instance of the term in the list of common terms 20. Only the first occurrence of each term in a document is recorded in a document surrogate. Thus if a term produced in the tokenization process for a particular document is found again in that document, an additional entry for that term is not created in the document surrogate for that document. In an alternative embodiment entries in the term list may be information other than pointers; for instance, the actual term may be placed in the term list. Alternate embodiments of the present invention may store more than the first occurrence of a term in the term list.

If a document term list separator occurs immediately after the term (or, in the case of a compound term or alternate form, among tokens comprising the term), a term list separator is added to the term list. In this manner the list of term pointers in the document surrogate is divided into zones. Each term in the surrogate occurs in a term list zone corresponding to the document zone in which the document term corresponding to the surrogate term appears. Dividing the document surrogate into zones provides a low cost manner of indicating the importance of a term to a document. In an exemplary embodiment of the present invention each document surrogate term list is divided into ten zones of substantially equal size by nine term list separators. Each term list entry marks the first appearance of the corresponding term in the document. Since only the first instance of a term is placed in a document surrogate, often no terms appear in the last several zones in a document surrogate; separators may be omitted for such empty zones.

Pointers are not created from the term's term list entry to entries in the list of alternate forms 40. If, during searching, it is to be determined whether or not an alternate form is in a surrogate, the normal form for that alternate form may be obtained from the list of alternate forms 40; the normal form may then be used for searching. Thus, information on the exact form of the term as it appears in the original document is lost—all that is represented in the document surrogate is the existence of a term which has various forms. The list of alternate forms 40 is created before tokenization is carried out, and thus alternate forms do have to be added to the list of alternate forms 40 as they are detected in documents. Entries in the list of alternate forms 40 do not have a frequency indicator.

In step 518, if there are still terms in the document token stream, server processor 310 proceeds to step 508. If there are no more terms in the token stream, server processor 310 proceeds to step 522.

In step 522, if there are further documents to tokenize, server processor 310 proceeds to step 504. If there are no more documents to tokenize the server proceeds to step 524.

In step 524, server processor 310 separates the terms currently in the list of common terms 20 into common terms and distinguishing terms. At this point all terms occurring in the set of documents are in the list of common terms 20, possibly in their normal form or root form. Pointers 120-23 lead from entries in document surrogates 90–94 to the terms.

In an exemplary embodiment of the present invention, server processor 310 sorts the list of common terms 20 from the least frequent to most frequent. The first N terms (the least common) are moved from the list of common terms 20 to the list of distinguishing terms 30. N may be a pre-set size, for example 65,536, or may be determined according to the number of terms in the document set. In an exemplary embodiment, terms are stored in the list of distinguishing terms 30 in order of frequency, from most to least frequent. This allows for better encoding of the list of distinguishing terms 30, and allows for terms in the list of distinguishing terms 30 to be referenced using a space saving method similar to a Huffman encoding method. When a term is moved from the list of common terms 20 to the list of distinguishing terms 30, the pointers 120-23 from document surrogates 90–94 to that term are altered to point to that term's new entry in the list of distinguishing terms 30. After the list of common terms 20 is separated into a list of common terms 20 and a list of distinguishing terms 30 the frequency indicators are removed.

After the list of common terms 20 has the distinguishing terms removed, server processor 310 removes entries in document surrogates 90–94 pointing to terms in the list of common terms 20. Common terms in the list of common terms 20 are used during a search of the document set to reduce the need for an assumption resulting in false positives.

At this point the metadata 10 includes document surrogates 90–94, the list of common terms 20, the list of distinguishing terms 30, and the list of alternate forms 40. Alternate methods may be used to create the metadata 10 of the present invention. It is not necessary that the lists of common and distinguishing terms be created in any particular order or by any particular method. It is not necessary that the document surrogates or the list of common terms, the list of distinguishing terms or the list of alternate forms be of the structure described above. For instance, the metadata 10 of the present invention need not have the term list of the document surrogate divided into zones. Furthermore, the metadata 10 of the present invention is not limited to metadata having the particular components described here. The method and system of the present invention do not require compound terms or alternate forms of terms.

While the goal of the present invention is to reduce the size of the metadata used to search a set of documents, it is possible that compound terms or alternate forms of terms will be created which are not in any document in the database to which the terms are applied. However, since the number of compound terms and alternate forms is small compared to the number of terms which are merely tokens, and since the combined size of the several lists of terms are small compared with the total size of document surrogates 90–94, the cost of this storage is not significant.

The server processor 310, in conjunction with a human operator, creates metadata 10 comprising a set of topic profiles 60–63, a set of document surrogates 90–94, a list of common terms 20, a list of distinguishing terms 30 and a list of alternate forms 40. In an alternate embodiment of the present invention, alternate forms may be listed in a term definition, a data structure representing a term and all of its alternates, instead of in a list of alternate forms. Metadata 10 is a compact, easily distributable representation of the document set, which allows for searching on the document set based on queries comprising both topic and term information. The metadata 10 is transmitted to client processor 300 to allow client processor 300 to search on the document set. Alternatively, metadata 10 may be recorded on a computer readable medium, such as a CD-ROM, and distributed to client processors for searching. Metadata 10 may be used for searching on any processor, not just client processor 300.

In one alternate embodiment, the list of common terms and distinguishing terms may be combined into one list. In such an embodiment, the list is sorted according to frequency in the document set, from least to most frequent. The first N terms of this list are considered to be distinguishing terms, and have the appropriate pointers from the document surrogates. The remainder of entries in the list are considered to be common terms, and thus have no such pointers.

In an alternate embodiment metadata 10 may be augmented as documents are added to the document set. Additional document surrogates 90–94 are created and the list of common terms 20, the list of distinguishing terms 30 and the list of alternate forms 40 are updated. Pointers are created from the list of distinguishing terms 30 to the new document surrogates 90–94. Terms may be added to these lists, and due to the change in the frequency of the occurrence of certain terms across the document set, terms may be moved between the list of common terms 20 and the list of distinguishing terms 30. In addition, in other embodiments, the list of common terms 20 may not be used. The metadata of the present invention is not restricted to that requiring the specific term and topic search information described herein. In other embodiments different methods may be used to search by term, not requiring an inverted list of distinguishing terms 30. For instance, the integrated metadata may consist of a reduced text index of a different type than the text metadata described herein, combined with topic information.

The topics may be defined in a manner different than that described above. In an alternate embodiment a user may create some or all of the topic profiles after receiving the metadata at the client processor. In such an embodiment, it is not necessary that any topic profiles be created at the server processor.

In an exemplary embodiment of the present invention the metadata may be transmitted to a client processor for searching. Prior to searching, additional information, derived from the metadata, is added to the metadata itself to facilitate searching over the document set; the result is supplemented metadata. The client processor creates data structures indexing the document surrogates by term and by topic. The client processor creates topic references from topic profiles to document surrogates. A topic reference provides, via a pointer or a number, for example, an indication of the relevancy of a topic represented by a profile to a document. A topic reference which is a null pointer or zero value indicates there is no correspondence. If no documents are relevant to a topic the set of topic references for the corresponding topic profile may be empty, or may be a set of zero values. The client processor similarly creates pointers from the list of distinguishing terms to document surrogates containing those terms.

After creating the supplemented metadata the client processor accepts user queries, consisting of topics and terms, and searches the metadata to return a ranked list of documents. The user may form the query with the aid of visualization tools, where the set of documents resulting from a query is presented as a multi-dimensional graph, the axes of the graph representing the relevancy of the documents to query elements—topics and terms. The user may perform searches on the graphically presented data or manipulate this data in a graphical manner.

After the user has a set of returned documents, the user may access the server processor for the full text of the returned documents or to conduct additional searching using the server processor.

The metadata may be filtered prior to supplementing and searching. The metadata may be filtered at the server processor, the client processor or at another processor. The metadata is filtered based on a filtering query provided by the user or based on a pre-determined filtering query. Filtering allows a smaller, more manageable and more focused set of metadata to be searched by the user, and when performed at a site remote from the client processor, filtering reduces the amount of metadata that is transmitted to and stored by the client processor.

Searching on a client processor may be combined with searching on a server processor. Results from each search may be stored on a client processor in the form of search process states to allow for a more effective search process. A search process state includes the search domain (the set of documents over which a search is conducted, or the set of references to these documents) and other information. Storing the state of the search on a client processor eliminates the need for a server processor to maintain search process states for the numerous users serviced by the server processor.

V. Including Compound Terms and Alternate Forms in Topic Profiles

In an alternate embodiment alternate forms and compound terms are included in topic profiles; each topic profile includes a list of compound terms and a list of alternate forms relevant to that profile. Each compound term in a topic profile's list of compound terms is a string and has a normal form used to represent the term in the metadata. Each topic profile includes a list of alternate forms. An alternate form in the list of alternate forms may be a string of tokens; such strings are enclosed in quotes. If the normal form of an alternate form is such a string, it is represented elsewhere in the metadata (for example in the list of distinguishing terms 30) as the string with spaces replaced with underscores. The alternate forms list may include alternate forms of compound terms. In this embodiment a user may define an empty topic profile to contain miscellaneous compound terms which are not part of any other topic profile.

VI. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

In alternate embodiments the metadata may be of any structure allowing for a resource efficient search, or a search over more than one filtering criterion. The specific structures described above—the document surrogates, topic profiles, and lists, need not be used. The specific methods of creating metadata and of searching need not be used. For instance, using inverted topic and term lists, zoned term lists, and weights is not required.

The method of the present invention does not require compound terms or alternate forms. In other embodiments, alternate forms and compound terms may be defined in data structures other than those described herein. The metadata may use a reduced text index of a different type than that described herein. Topics may be defined in a manner different than that described above. In other embodiments, the weight attached to each profile term in a topic profile may allow for a more complex evaluation. The topic profiles may be created in a hierarchy of topics and sub-topics.

The metadata may be distributed on a storage device such as a floppy disk or CD-ROM, instead of being transmitted via a communications link.

What is claimed is:

1. A method for creating metadata comprising:
    generating a set of topic profiles, where each topic profile defines a set of relationships between a topic and an at least one document in a set of documents, the at least one document comprising a set of terms; and
    generating a set of document surrogates, each document surrogate comprising at least a subset of the terms appearing in a document.

2. The method of claim 1 where each topic profile defines a set of relationships after the topic profile is applied to the at least one document.

3. The method of claim 2 further comprising the step of creating a set of distinguishing terms, the set of distinguishing terms comprising at least a subset of the terms in the set of surrogates.

4. A method for creating metadata representing a set of documents, each document comprising a set of terms, comprising:
    creating a set of topic profiles, each topic profile corresponding to a topic, each topic profile providing the ability to define a relationship between the corresponding topic and an at least one of the documents; and
    creating a set of surrogates, each surrogate corresponding to a document, each surrogate comprising at least a subset of the terms appearing in the corresponding document.

5. The method of claim 4 where each topic profile comprises a set of terms.

6. The method of claim 5 further comprising the step of, for each topic profile creating a set of topic references, each topic reference referring to at least a subset of the surrogates.

7. The method of claim 6 further comprising the step of creating a set of distinguishing terms, the set of distinguishing terms comprising at least a subset of the terms in the set of surrogates.

8. The method of claim 7 where each topic profile defines a set of relationships after the topic profile is applied to the at least one document.

9. The method of claim 7 where the step of creating the topic profiles and surrogates includes the step of creating the topic profiles and surrogates at a first processor, and the step of creating the set of topic references includes the step of creating the set of topic references at a second processor.

10. The method of claim 4 where the relationship between a topic and a document is a numerical value.

11. The method of claim 9 where each topic profile comprises a set of terms.

12. The method of claim 4 where each topic profile comprises a set of terms, the relationship is a numerical value, the numerical value of each topic-document pair being computed based on a correspondence between the terms in the surrogate corresponding to the document and the terms in the topic profile corresponding to the topic.

13. The method of claim 12 further comprising the step of creating a set of distinguishing terms, the set of distinguishing terms comprising at least a subset of the terms in the set of surrogates.

14. The method of claim 4, performing the steps of creating the topic profiles and creating the surrogates by a first processor, further comprising the step of transmitting the metadata to a second processor.

15. A computer system comprising a metadata creation module, the metadata creation module creating metadata representing a set of documents, each document comprising a set of terms, the metadata comprising:
    a set of topic profiles, each topic profile corresponding to a topic, each topic profile providing the ability to define a relationship between the corresponding topic and an at least one of the documents; and
    a set of surrogates, each surrogate corresponding to a document, each surrogate comprising at least a subset of the terms appearing in the corresponding document.

16. The system of claim 15 where each topic profile comprises a set of terms.

17. The system of claim 15 where each topic profile comprises a set of topic references, each topic reference referring to at least a subset of the surrogates.

18. A system for creating metadata corresponding to a set of documents, each document comprising a set of terms, the system comprising:
    a profile module for generating a set of topic profiles, where each topic profile defines a set of relationships between a topic an at least one of the documents; and
    a surrogate module for generating a set of document surrogates, each document surrogate comprising at least a subset of the terms appearing in a document.

19. The system of claim 18 where each topic profile defines a set of relationships after the topic profile is applied to the at least one document.

20. The system of claim 19 further comprising a term module for creating a set of distinguishing terms, the set of distinguishing terms comprising at least a subset of the terms in the set of surrogates.

21. A program storage device readable by a computer system, for storing a plurality of instructions for creating metadata representing a set of documents, each document comprising a set of terms, the plurality of instructions comprising:
    instructions for creating a set of topic profiles, each topic profile corresponding to a topic, each topic profile providing the ability to define a relationship between the corresponding topic and an at least one of the documents; and
    instructions for creating a set of surrogates, each surrogate corresponding to a document, each surrogate comprising at least a subset of the terms appearing in the corresponding document.

22. The program storage device of claim 21 where each topic profile comprises a set of terms.

23. The program storage device of claim 22 further comprising instructions for creating for each topic profile creating a set of topic references, each topic reference referring to at least a subset of the surrogates.

24. A method for creating metadata comprising:
    creating a set of surrogates, each surrogate comprising information about a document in a set of documents;
    creating a set of first search items, each of the first search items providing the ability to locate documents in the set of documents corresponding a term; and
    creating a set of second search items, each of the second search items providing the ability to locate documents in the set of documents corresponding to a topic.

25. The method of claim 24 where each of the first search items may be applied to a surrogate to produce a numerical value.

26. The method of claim 25 where the metadata is created at a first processor and comprising the further step of transmitting the metadata to a second processor.

* * * * *